US012152617B2

(12) United States Patent
Sugimoto et al.

(10) Patent No.: US 12,152,617 B2
(45) Date of Patent: Nov. 26, 2024

(54) COUPLING STRUCTURE

(71) Applicants: The Ritsumeikan Trust, Kyoto (JP); KYB Corporation, Tokyo (JP)

(72) Inventors: Shunichi Sugimoto, Kakogawa (JP); Sang-Ho Hyon, Kyoto (JP); Yasushi Saitou, Nagano (JP); Sadayuki Kamikura, Nagano (JP)

(73) Assignees: THE RITSUMEIKAN TRUST, Kyoto (JP); KYB CORPORATION, Tokyo (JP)

( * ) Notice: Subject to any disclaimer, the term of this patent is extended or adjusted under 35 U.S.C. 154(b) by 0 days.

(21) Appl. No.: 18/245,294

(22) PCT Filed: Oct. 1, 2021

(86) PCT No.: PCT/JP2021/036514
§ 371 (c)(1),
(2) Date: Mar. 14, 2023

(87) PCT Pub. No.: WO2022/071599
PCT Pub. Date: Apr. 7, 2022

(65) Prior Publication Data
US 2023/0366423 A1    Nov. 16, 2023

(30) Foreign Application Priority Data
Oct. 2, 2020    (JP) ................ 2020-167737

(51) Int. Cl.
*F16M 11/00* (2006.01)
*F16B 13/10* (2006.01)
*F16B 2/06* (2006.01)

(52) U.S. Cl.
CPC ............. *F16B 13/10* (2021.08); *F16B 2/06* (2013.01)

(58) Field of Classification Search
CPC .... F16B 13/10; F16B 2/06; F16B 5/00; F16B 17/00; E04B 1/48
See application file for complete search history.

(56) References Cited

U.S. PATENT DOCUMENTS 3,325,585 A * 6/1967 Brenneman ............... E04B 1/49
52/287.1
11,098,742 B2 * 8/2021 Athas .................... F16B 19/109
(Continued)

FOREIGN PATENT DOCUMENTS

| JP | 2017-040594 A | 2/2017 |
| JP | 2018-153542 A | 10/2018 |
| JP | 2018-192607 A | 12/2018 |

*Primary Examiner* — Amy J. Sterling
(74) *Attorney, Agent, or Firm* — Rabin & Berdo, P.C.

(57) ABSTRACT

A coupling structure for coupling a first member and a second member includes a rod-shaped part configured to be received across a first hole formed in the first member and a second hole formed in the second member. The rod-shaped part has a first insertion portion configured to be inserted into the first hole of the first member, and a second insertion portion configured to be inserted into the second hole of the second member. The coupling structure further includes a fixing configuration, the fixing configuration being configured to fix the first insertion portion and the first member by applying an external force to the first insertion portion, and the fixing configuration being configured to fix the second insertion portion and the second member by applying an external force to the second insertion portion.

9 Claims, 12 Drawing Sheets

(56) References Cited

U.S. PATENT DOCUMENTS

| | | | |
|---|---|---|---|
| 11,739,776 B1* | 8/2023 | Dolfini | F16B 2/06 |
| | | | 403/373 |
| 2016/0341234 A1* | 11/2016 | Germann | B29C 65/601 |
| 2018/0271739 A1 | 9/2018 | Watabe et al. | |
| 2018/0333844 A1 | 11/2018 | Inoue et al. | |
| 2023/0175544 A1* | 6/2023 | Nill | E06B 3/5436 |
| | | | 411/337 |

* cited by examiner

COUPLING STRUCTURE

TECHNICAL FIELD

The present invention relates to a coupling structure for coupling two members.

BACKGROUND ART

In recent years, a wide variety of robots, such as industrial robots, transport robots, assistance robots, and so forth, have been developed. JP2018-192607A discloses an industrial robot that performs replacement work of cables. JP2017-40594A discloses a transport robot that carries packages. JP2018-153542A discloses a gait assistance robot that assists gait exercise of a user.

SUMMARY OF INVENTION

For the robots of these types, there may be a case in which a plurality of modules are coupled to assemble the robot. If it takes time to couple the plurality of modules, it will require a long time until activation of the robot is started.

An object of the present invention is to provide a coupling structure capable of coupling a plurality of members with ease.

According to one aspect of the present invention, a coupling structure for coupling a first member and a second member, the coupling structure includes a rod-shaped part configured to be received across a first hole formed in the first member and a second hole formed in the second member. The rod-shaped part has: a first insertion portion configured to be inserted into the first hole of the first member; and a second insertion portion configured to be inserted into the second hole of the second member. The coupling structure further includes fixing means, the fixing means being configured to fix the first insertion portion and the first member by applying an external force to the first insertion portion, and the fixing means being configured to fix the second insertion portion and the second member by applying an external force to the second insertion portion.

DESCRIPTION OF EMBODIMENTS

Embodiments of the present invention will be described below with reference to the drawings.

First Embodiment

A coupling structure 100 according to a first embodiment of the present invention will be described with reference to FIGS. 1 to 6. The coupling structure 100 is a structure for coupling two members (a first member 10 and a second member 20).

Figure 1:
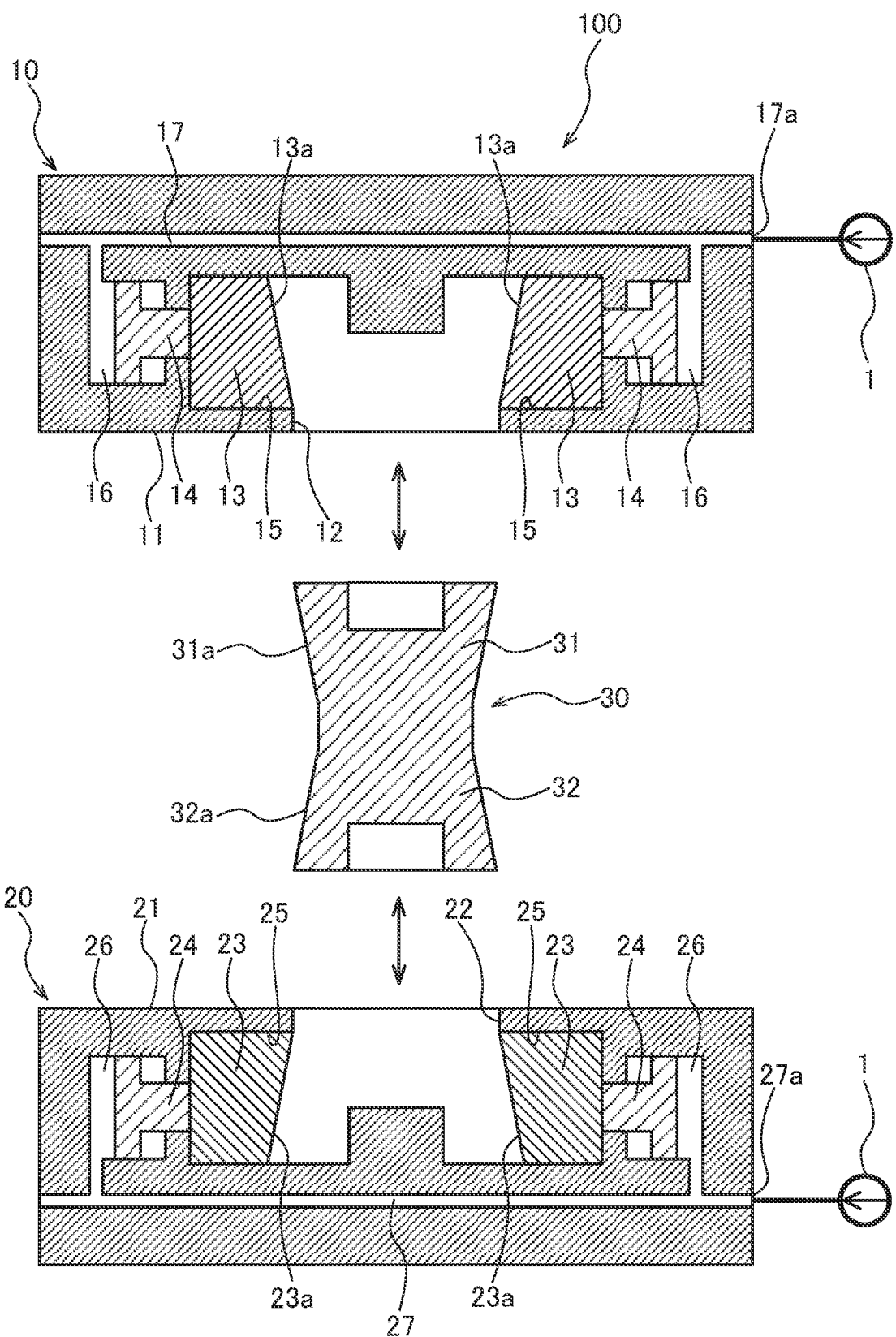
FIG. 1 is a conceptual diagram of a coupling structure according to a first embodiment of the present invention and shows a state in which a first member and a second member are not coupled.
Figure 2:
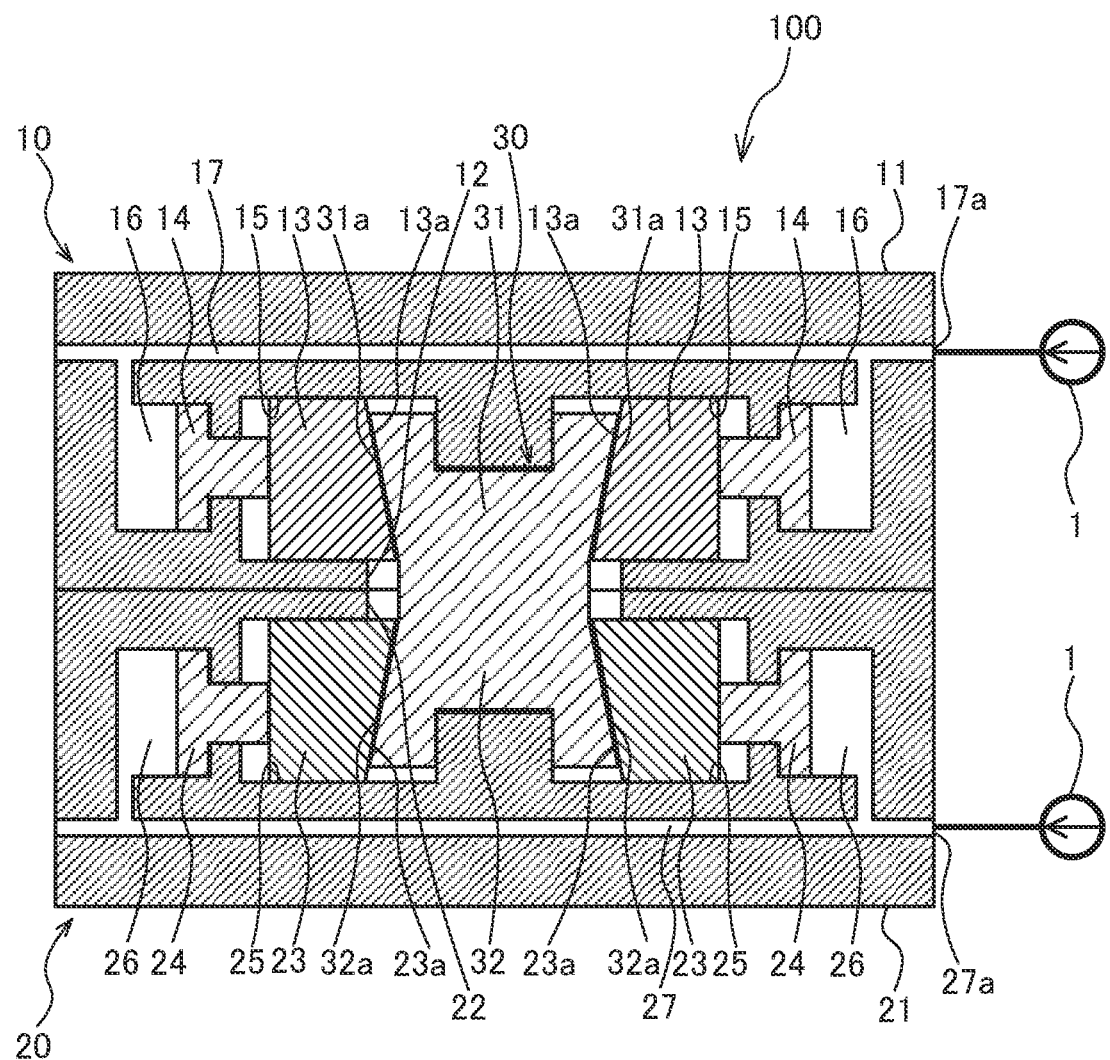
FIG. 2 is a conceptual diagram of the coupling structure according to the first embodiment of the present invention and shows a state in which the first member and the second member are coupled.

A concept of the coupling structure 100 will be described first with reference to FIGS. 1 and 2. FIG. 1 is a conceptual diagram of the coupling structure 100 and shows a state in which the first member 10 and the second member 20 are not coupled, and FIG. 2 is a conceptual diagram of the coupling structure 100 and shows a state in which the first member 10 and the second member 20 are coupled.

Mutually opposing surfaces 11 and 21 of the first member 10 and the second member 20 are formed with a first hole 12 and a second hole 22, respectively. The coupling structure 100 is provided with a dowel member 30 serving as a rod-shaped part that is received across the first hole 12 and the second hole 22. The first member 10 and the second member 20 are coupled via the dowel member 30.

The dowel member 30 is a columnar shaped member having a first insertion portion 31 that is to be inserted into the first hole 12 of the first member 10 and a second insertion portion 32 that is to be inserted into the second hole 22 of the second member 20. The dowel member 30 is made of metal or resin.

The coupling structure 100 is further provided with fixing means that fixes the first insertion portion 31 and the first member 10 by applying an external force to the first insertion portion 31 and that fixes the second insertion portion 32 and the second member 20 by applying the external force to the second insertion portion 32. In the first embodiment, the fixing means has a configuration that is configured to tighten the dowel member 30 using hydraulic pressure and fix the dowel member 30. Specifically, the fixing means has: first clamps 13 that are provided in the first member 10 so as to face an outer circumferential surface of the first insertion portion 31; second clamps 23 that are provided in the second member 20 so as to face an outer circumferential surface of the second insertion portion 32; first pistons 14 that are provided in the first member 10 and that respectively push the first clamps 13 against the outer circumferential surface of the first insertion portion 31 by receiving the hydraulic pressure; and second pistons 24 that are provided in the second member 20 and that respectively push the second clamps 23 against the outer circumferential surface of the second insertion portion 32 by receiving the hydraulic pressure.

The first clamps 13 are each accommodated in a clamp accommodating chamber 15 formed in the first member 10 so as to be freely movable. The first pistons 14 are each accommodated in a pressure chamber 16 so as to be freely slidable. The first piston 14 is moved forward and brought into contact with the first clamp 13 by pressure of working oil supplied to the pressure chamber 16, thereby pushing the first clamp 13 against the outer circumferential surface of the first insertion portion 31. Similarly, the second clamps 23 are each accommodated in a clamp accommodating chamber 25 formed in the second member 20 so as to be freely movable. The second pistons 24 are each accommodated in a pressure chamber 26 so as to be freely slidable. The second piston 24 is moved forward and brought into contact with the second clamp 23 by the pressure of the working oil supplied to the pressure chamber 26, thereby pushing the second clamp 23 against the outer circumferential surface of the second insertion portion 32.

The first member 10 is formed with a supply passage 17 that guides the working oil from a pump 1 serving as a hydraulic pressure source to the pressure chamber 16, and the second member 20 is formed with a supply passage 27 that guides the working oil from the pump 1 to the pressure chamber 26.

The outer circumferential surfaces of the first insertion portion 31 and the second insertion portion 32 are respectively formed with tapered portions 31a and 32a each having a diameter increasing towards an end portion. A surface of each of the first clamps 13 facing the outer circumferential surface of the first insertion portion 31 is formed with a tapered portion 13a that is adapted to the tapered portion 31a of the first insertion portion 31. A surface of each of the second clamps 23 facing the outer circumferential surface of the second insertion portion 32 is formed with a tapered portion 23a that is adapted to the tapered portion 32a of the second insertion portion 32. The tapered portion 31a of the first insertion portion 31 and the tapered portions 13a of the first clamps 13 are formed to have substantially the same angle, and so, when the first clamps 13 are pushed against the outer circumferential surface of the first insertion portion 31, the first insertion portion 31 is subjected to a force in the direction that inserts the first insertion portion 31 into the first hole 12 along the first clamps 13. Similarly, the tapered portion 32a of the second insertion portion 32 and the tapered portions 23a of the second clamps 23 are formed to have substantially the same angle, and so, when the second clamps 23 are pushed against the outer circumferential surface of the second insertion portion 32, the second insertion portion 32 is subjected to the force in the direction that inserts the second insertion portion 32 into the second hole 12 along the second clamps 23.

Next, a coupling method of the first member 10 and the second member 20 by the coupling structure 100 will be described.

The first insertion portion 31 and the second insertion portion 32 of the dowel member 30 are inserted into the first hole 12 of the first member 10 and the second hole 22 of the second member 20, respectively. In other words, the dowel member 30 is received across the first hole 12 of the first member 10 and the second hole 22 of the second member 20. In this state, as the working oil is supplied from the pump 1 to the pressure chamber 16 of the first member 10 and the pressure chamber 26 of the second member 20, as shown in FIG. 2, the first pistons 14 of the first member 10 are respectively moved forward and brought into contact with the first clamps 13 by the pressure in the pressure chambers 16, thereby respectively pushing the first clamps 13 against the outer circumferential surface of the first insertion portion 31. At the same time, the second pistons 24 of the second member 20 are respectively moved forward and brought into contact with the second clamps 23 by the pressure in the pressure chamber 26, thereby respectively pushing the second clamps 23 against the outer circumferential surface of the second insertion portion 32. With such a configuration, the first insertion portion 31 is subjected to the force in the direction that inserts the first insertion portion 31 into the first hole 12 along the first clamps 13, and the second insertion portion 32 is subjected to the force in the direction that inserts the second insertion portion 32 into the second hole 22 along the second clamps 23. As a result, the first member 10 and the second member 20 are respectively subjected to the force in the direction that causes them to approach each other, and then, the first member 10 and the second member 20 are coupled as the surface 11 and the surface 21, which are opposed to each other, are brought into contact (the state shown in FIG. 2). Thus, the first member 10 and the second member 20 are coupled by using the dowel member 30.

As described above, with the coupling structure 100, by applying the external force to the first insertion portion 31 and the second insertion portion 32 of the dowel member 30 by utilizing the hydraulic pressure, the first insertion portion 31 and the first member 10 are fixed, and at the same time, the second insertion portion 32 and the second member 20 are fixed, and thereby, the first member 10 and the second member 20 are coupled.

Even if the dimension is changed due to abrasion caused by the contact between the first insertion portion 31 and the first clamps 13 and abrasion caused by the contact between the second insertion portion 32 and the second clamps 23 in a state in which the first member 10 and the second member 20 are coupled by using the dowel member 30, because the contact surface between the first insertion portion 31 and the first clamps 13 and the contact surface between the second insertion portion 32 and the second clamps 23 have the tapered shape, the dimension change due to the abrasion is absorbed, and so, rattling of the first insertion portion 31 and the second insertion portion 32 is prevented.

The coupling between the first member 10 and the second member 20 is released by releasing the pressure in the pressure chambers 16 and 26 by stopping the supply of the working oil from the pump 1 to the pressure chamber 16 of the first member 10 and the pressure chamber 26 of the second member 20.

In the following, a modification of the above-mentioned embodiment will be described.

In the above-mentioned embodiment, a description has been given of the case in which the first member 10 and the second member 20 are coupled by bringing the surface 11 and the surface 21, which are opposed to each other, into the surface contact, and the dowel member 30 is received entirely in the axial direction across the first hole 12 and the second hole 22. However, the first member 10 and the second member 20 may be coupled such that a gap is formed therebetween. In such a case, a part of the dowel member 30 is exposed from the first hole 12 and the second hole 22.

In addition, it may be possible to employ a configuration in which the supply passage 17 of the first member 10 is communicated with the supply passage 27 of the second member 20 through a passage that penetrates through the dowel member 30 in the axial direction.

Furthermore, in addition to the supply passages 17 and 27, the first member 10 and the second member 20 may respectively be formed with discharge passages for discharging the working oil in the pressure chambers 16 and 26 when the coupling between the first member 10 and the second member 20 is to be released.

In addition, in the above-mentioned embodiment, a description has been given of the case in which the tapered portions 31a and 32a are respectively formed on the first insertion portion 31 and the second insertion portion 32, and the tapered portions 13a and 23a are respectively formed on the first clamps 13 and the second clamps 23. However, in the present invention, the tapered portions 31a, 32a, 13a, and 23a are not essential configurations. Even in a case in which the tapered portions 31a, 32a, 13a, and 23a are not formed, the first insertion portion 31 and the first member 10 are fixed as the first clamps 13 are pushed against the outer circumferential surface of the first insertion portion 31, and the second insertion portion 32 and the second member 20 are fixed as the second clamps 23 are pushed against the outer circumferential surface of the second insertion portion 32, and therefore, it is possible to couple the first member 10 and the second member 20.

In addition, in the above-mentioned embodiment, a description has been given of the case in which the first pistons 14 and the second pistons 24 are driven by using the working oil. However, compressed air, aqueous alternative fluid, or the like may be employed as working fluid in addition to the working oil.

Figure 3:
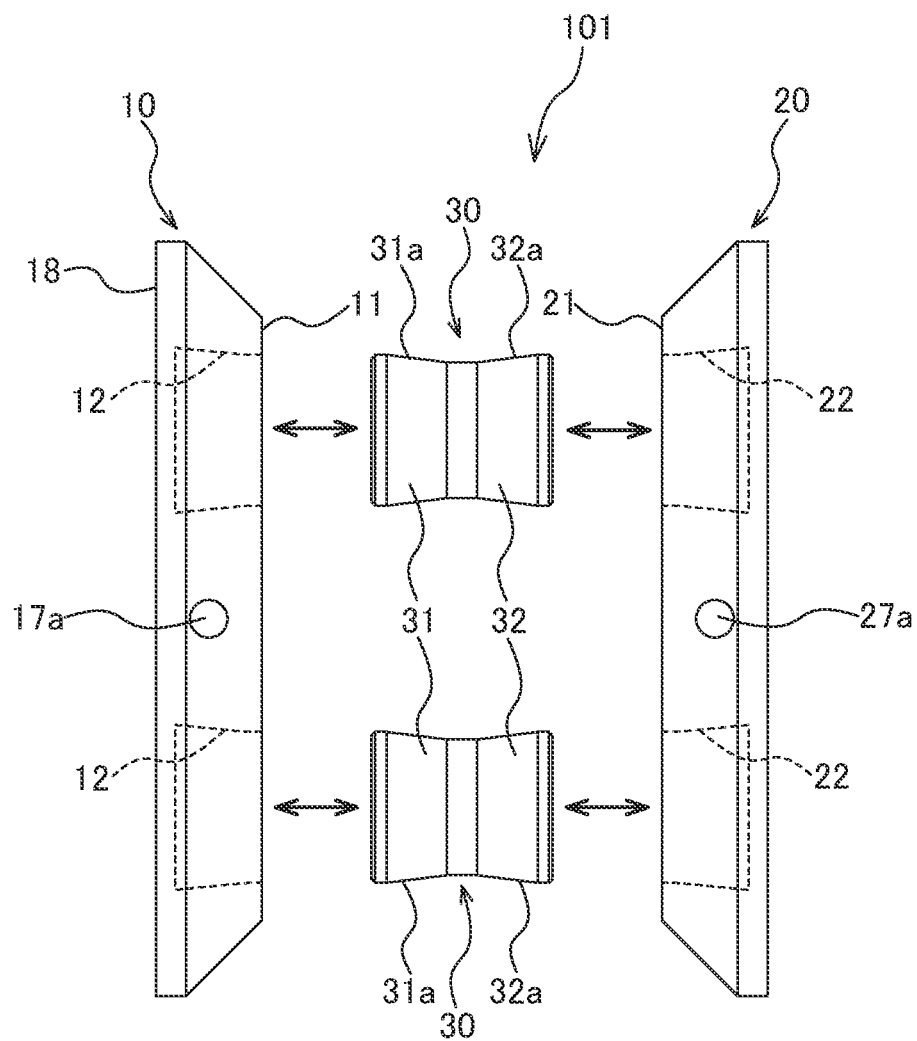
FIG. 3 is a side view of the coupling structure according to the first embodiment of the present invention and shows a state in which the first member and the second member are not coupled.
Figure 4:
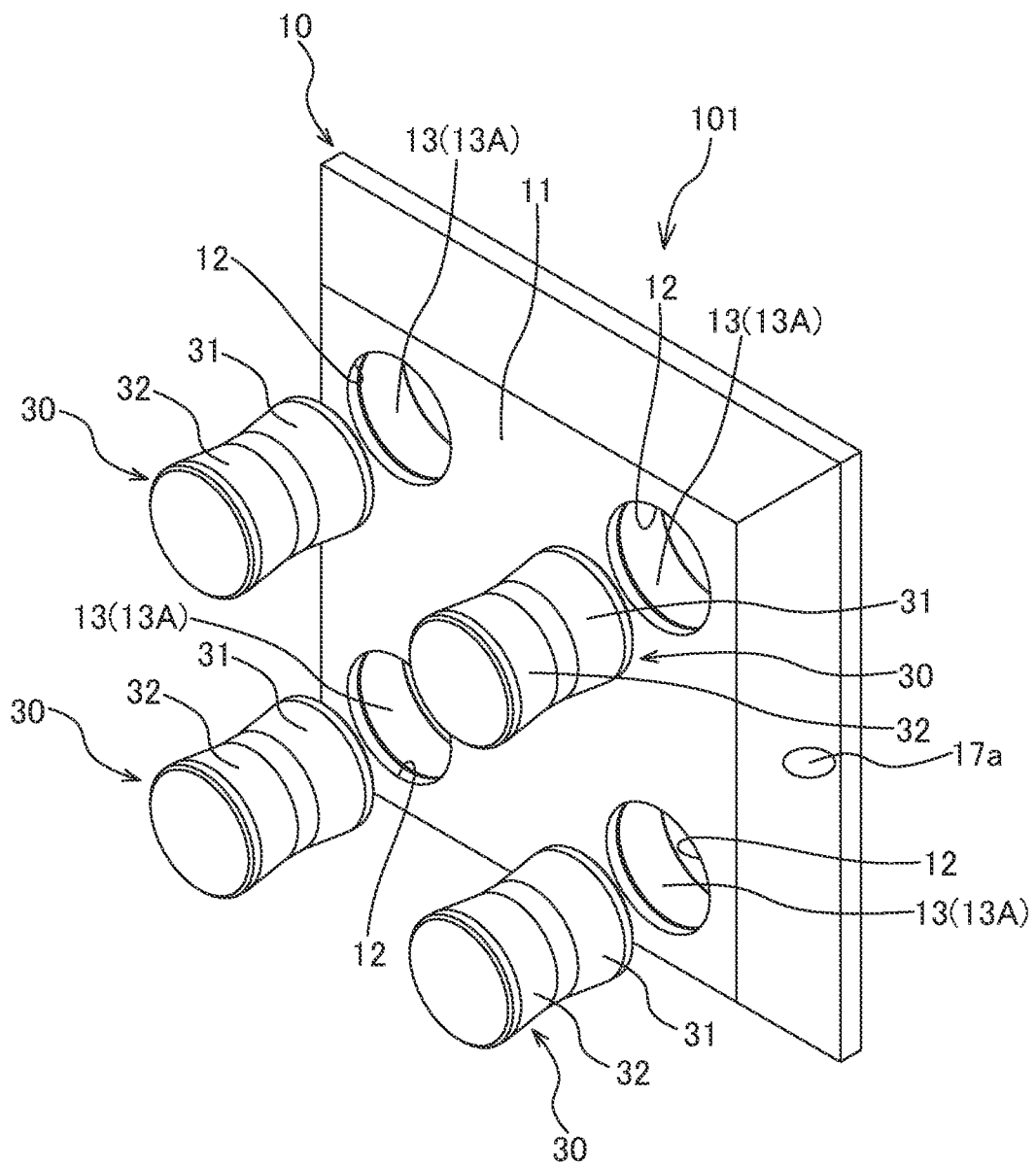
FIG. 4 is a perspective view of the first member and dowel members.
Figure 5:
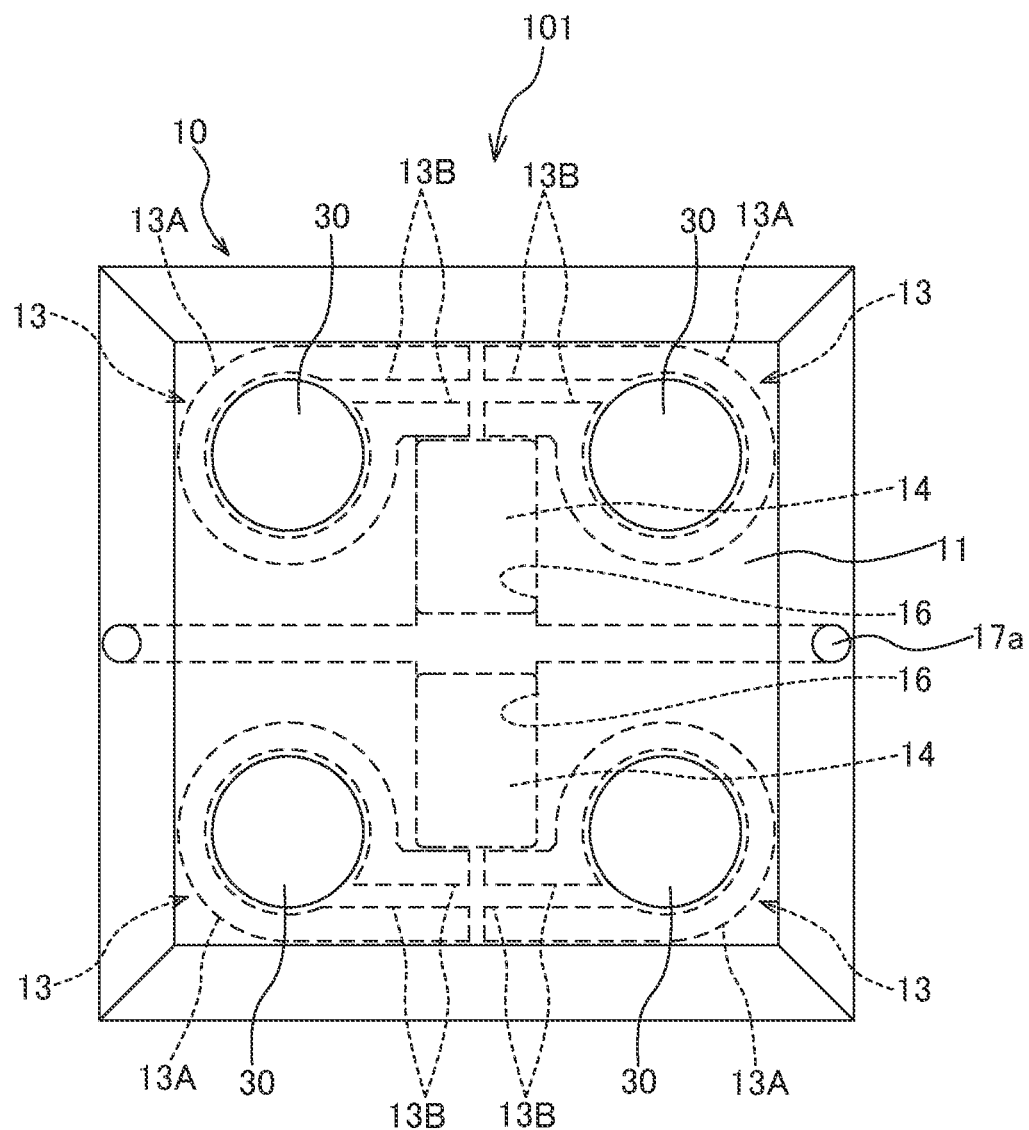
FIG. 5 is a plan view of the first member and the dowel members.

Next, as one specific example of the above-described coupling structure 100, a coupling structure 101 will be described with reference to FIGS. 3 to 5. FIG. 3 is a side view showing a state in which the first member 10 and the second member 20 are not coupled, FIG. 4 is a perspective view of the first member 10 and the dowel members 30, and FIG. 5 is a plan view of the first member 10 and the dowel members 30. Note that, in FIGS. 1, 2, and 3 to 5, components that have similar functions are assigned the same reference numerals.

In the coupling structure 101, the first member 10 and the second member 20 are coupled by using four dowel members 30.

Inlet portions 17a and 27a of the supply passages 17 and 27 are formed so as to respectively open at side surfaces of the first member 10 and the second member 20. As shown in FIG. 5, two pressure chambers 16 communicate with the supply passage 17, and the first pistons 14 are respectively accommodated in the pressure chambers 16 in a freely slidable manner.

The first clamps 13 are each formed to have a C-shape and each has a band portion 13A that is arranged so as to surround the outer circumferential surface of the first insertion portion 31 and a pair of tightening portions 13B that are respectively projected out from both end portions of the band portion 13A so as to form a gap therebetween. End portions of the first pistons 14 are arranged so as to respectively face the tightening portions 13B. In the coupling structure 101, the end portion of single first piston 14 faces both of the respective tightening portions 13B of two first clamps 13. Therefore, two first pistons 14 are provided for four first clamps 13.

As the working oil is supplied to the pressure chambers 16 through the supply passage 17, the first pistons 14 are moved forward and respectively brought into contact with the tightening portions 13B of the first clamps 13 by the pressure in the pressure chambers 16, thereby pressing the pair of tightening portions 13B such that the gap therebetween becomes smaller. By doing so, the band portions 13A are deformed so as to be pressed against the outer circumferential surface of the first insertion portion 31 and so as to be tightened around the outer circumferential surface of the first insertion portion 31. Because inner circumferential surfaces of the band portions 13A and the outer circumferential surfaces of the first insertion portions 31 are respectively formed with the tapered portions 13a and 31a, the first insertion portions 31 are subjected to the force in the direction that inserts the first insertion portions 31 into the first holes 12 along the first clamps 13. Although descriptions are omitted herein, similarly, the second insertion portions 32 are also subjected to the force in the direction that inserts the second insertion portions 32 into the second holes 22. As described above, the first member 10 and the second member 20 are coupled by being subjected to the force in the direction that causes them to approach each other.

In the coupling structure 101, because each of the first pistons 14 presses the tightening portions 13B of the two first clamps 13 at the same time, it is possible to tighten the two first clamps 13 together by the single first piston 14.

Next, a modification of the coupling structure 101 will be described with reference to FIG. 6.

Figure 6:
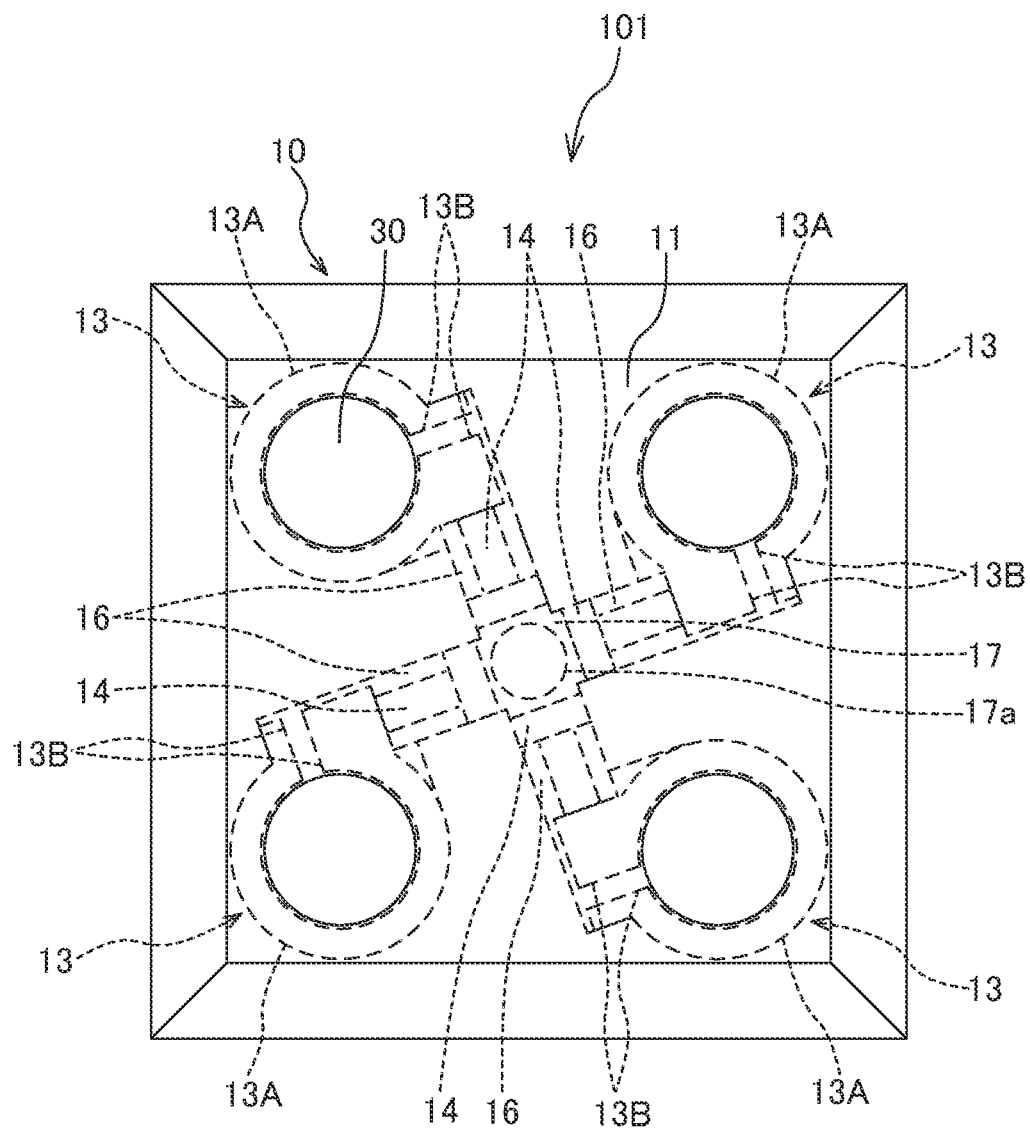
FIG. 6 is a diagram showing a modification of the first embodiment of the present invention and is a diagram corresponding to FIG. 5.

In the modification shown in FIG. 6, the inlet portion 17a of the supply passage 17 of the first member 10 is formed so as to open at a surface 18 of the first member 10 on the other side of the surface 11 (see FIG. 3). The supply passage 17 is communicated with four pressure chambers 16, and the first pistons 14 are respectively accommodated in the pressure chambers 16 in a freely slidable manner. In this modification, the first piston 14 is provided for each of four first clamps 13.

According to the first embodiment described above, the following effects are obtained.

In the coupling structure 100, 101, the first member 10 and the second member 20 are coupled via the dowel member 30 by applying the external force to the first insertion portion 31 and the second insertion portion 32 of the dowel member 30 by utilizing the hydraulic pressure. Therefore, compared with a case in which two members are coupled by using bolts, etc., it is possible to couple the first member 10 and the second member 20 with ease.

In addition, because no projections, such as pins, etc., for coupling the first member 10 and the second member 20 are formed on the mutually opposing surfaces 11 and 21 of the first member 10 and the second member 20 in a state in which the first member 10 and the second member 20 are not coupled, an excellent handling property is achieved during transportation and assembly of the first member 10 and the second member 20.

Second Embodiment

Next, a coupling structure 200 according to a second embodiment of the present invention will be described with reference to FIGS. 7 to 11. The components that have similar functions with those in the above-described first embodiment will be described by assigning the same reference numerals. Similarly to the coupling structure 100 according to the first embodiment, the coupling structure 200 is the structure for coupling the two members (the first member 10 and the second member 20), and the first member 10 and the second member 20 are coupled by using the dowel members 30 each serving as the rod-shaped part.

Figure 7:
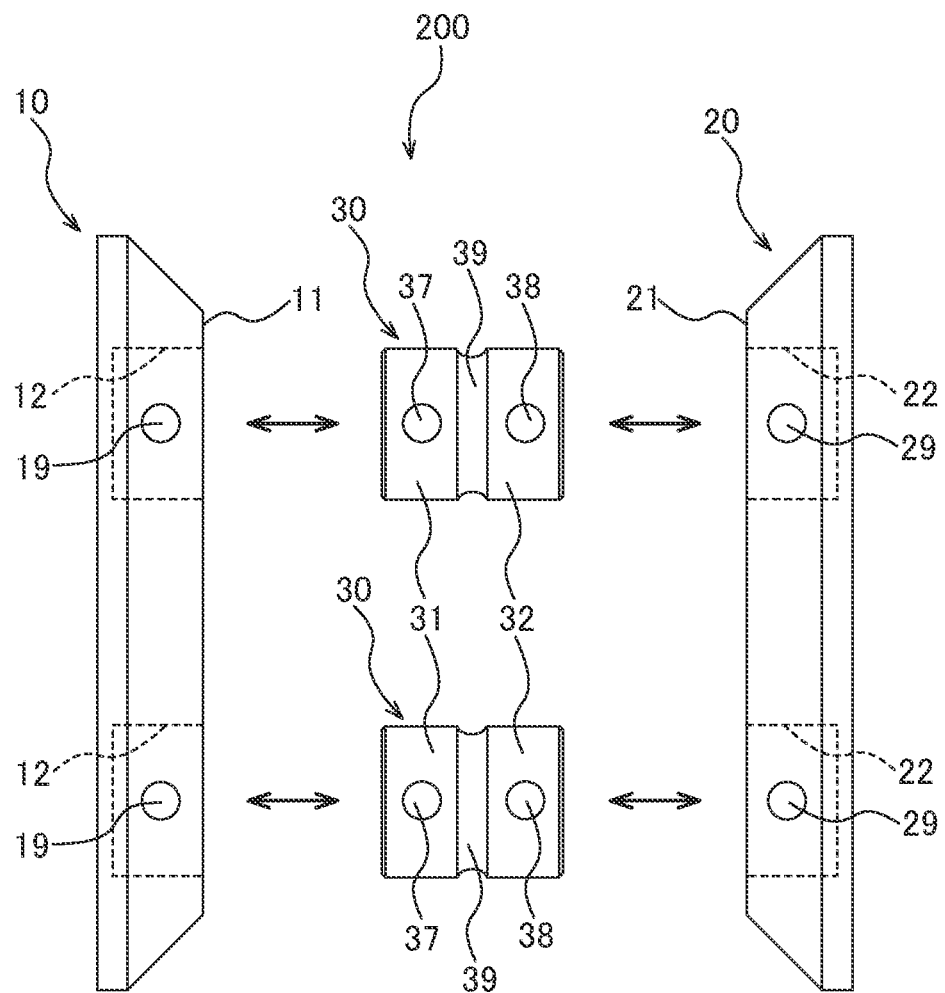
FIG. 7 is a side view of the coupling structure according to a second embodiment of the present invention and shows a state in which the first member and the second member are not coupled.
Figure 8:
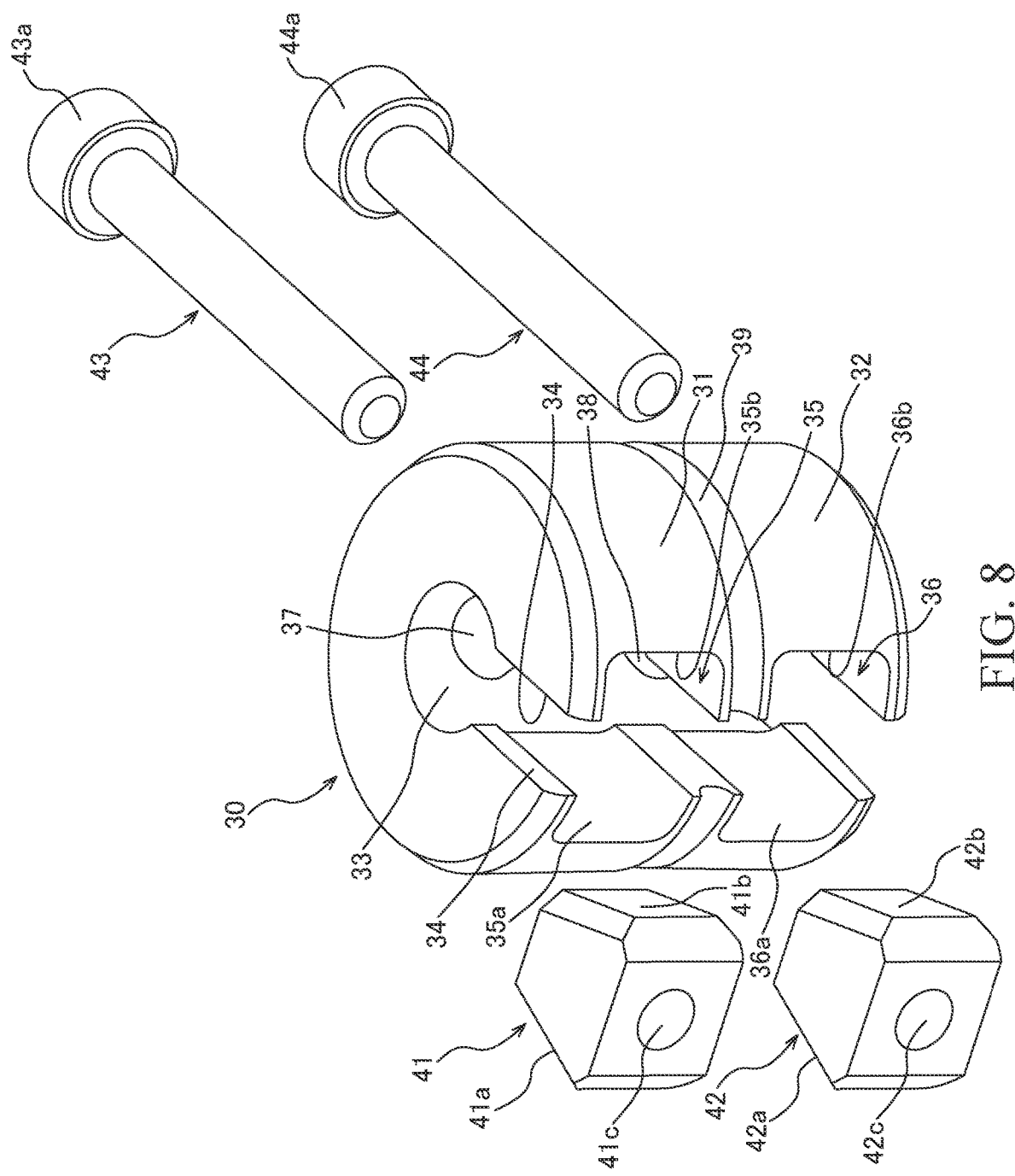
FIG. 8 is an exploded perspective view of the dowel member.
Figure 9:
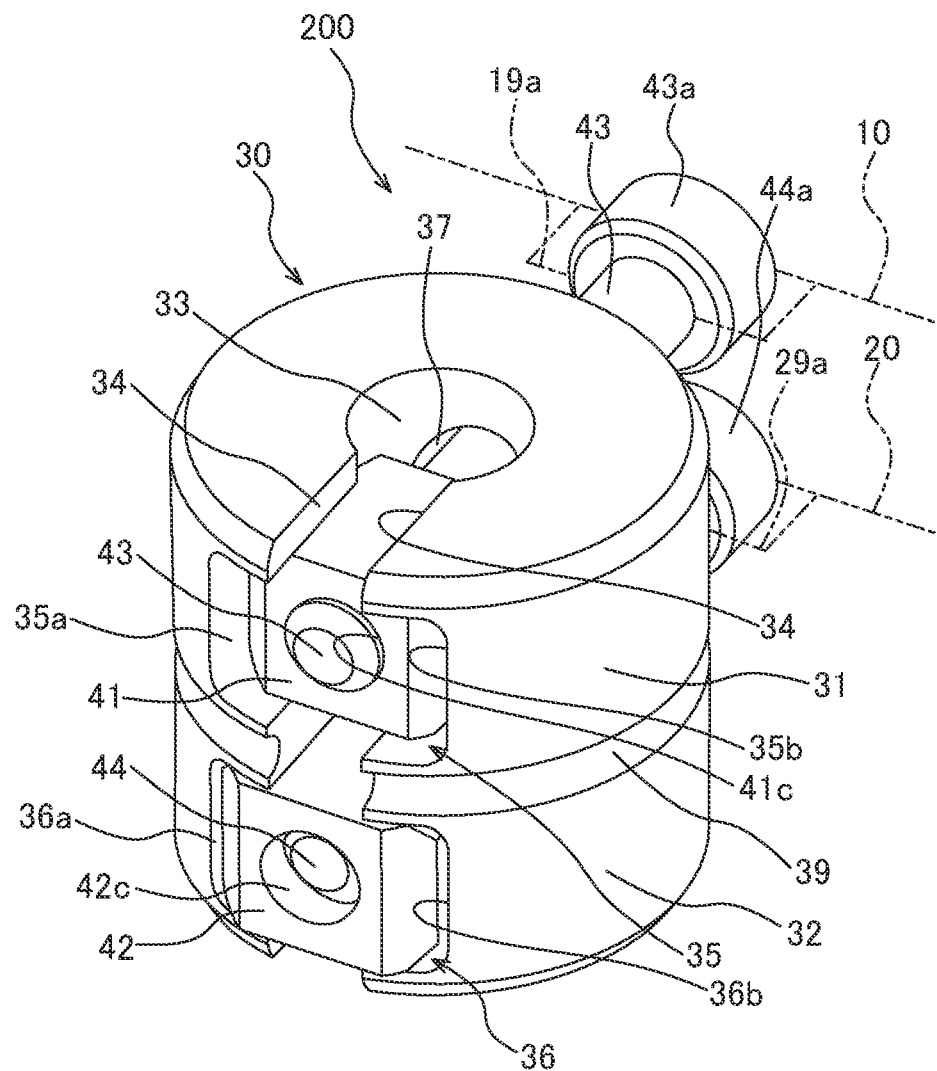
FIG. 9 is a perspective view showing a state in which the first member and the second member are being coupled.
Figure 10:
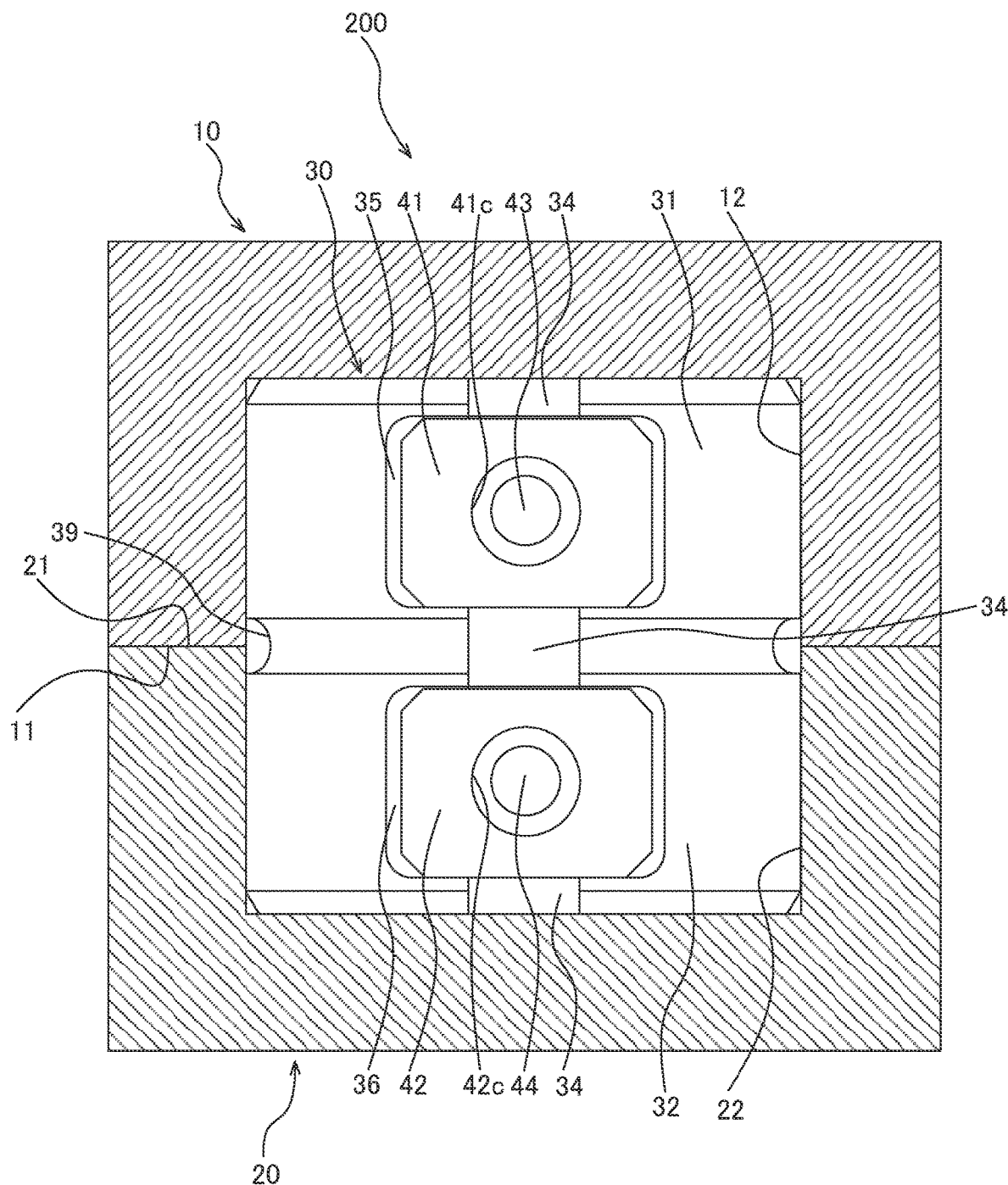
FIG. 10 is a front view of the coupling structure according to the second embodiment of the present invention.
Figure 11:
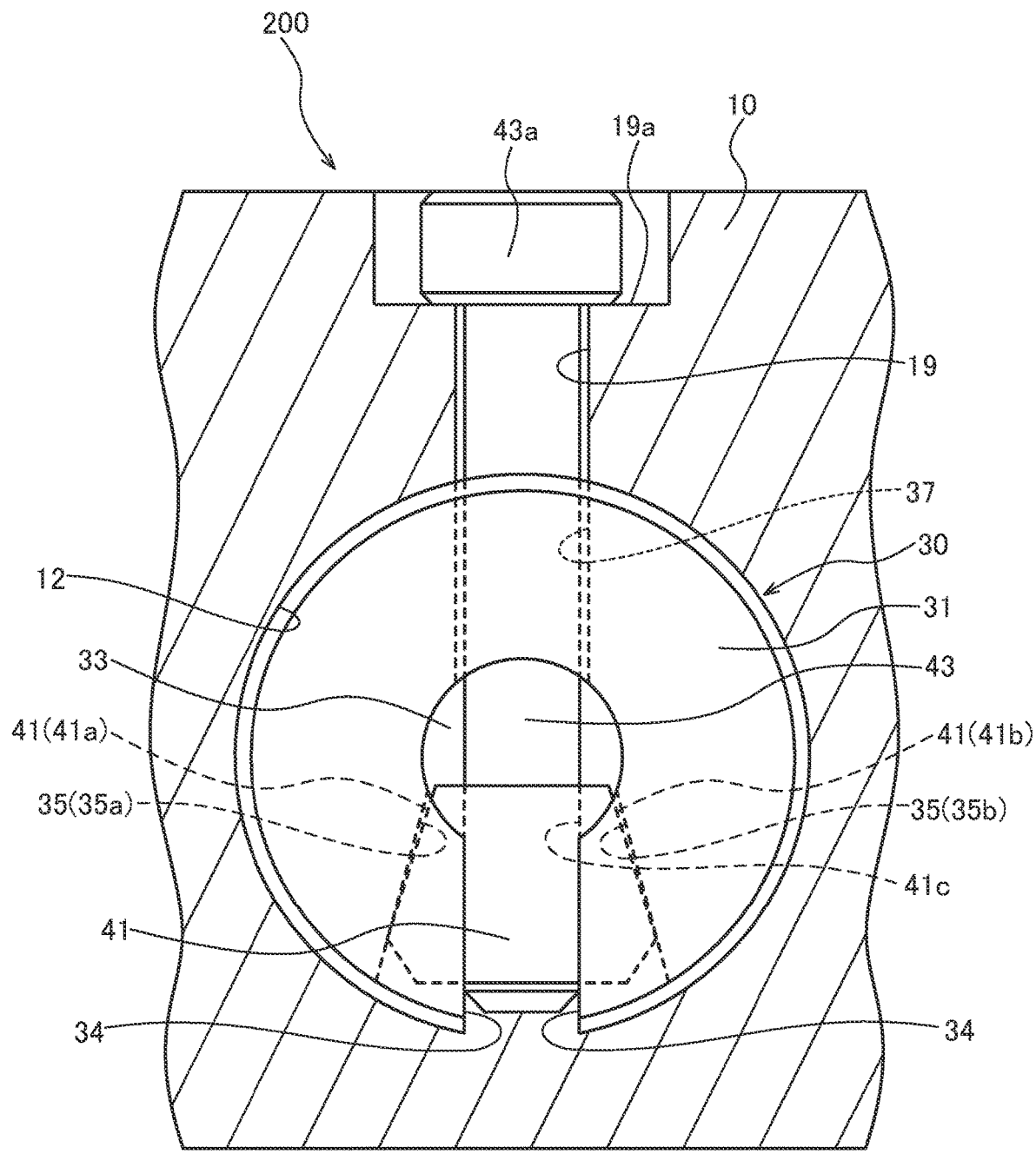
FIG. 11 is a plan view of the coupling structure according to the second embodiment of the present invention.

FIG. 7 is a side view showing a state in which the first member 10 and the second member 20 are not coupled, FIG. 8 is an exploded perspective view of the dowel member 30, FIG. 9 is a perspective view showing a state in which the first member 10 and the second member 20 are being coupled, FIG. 10 is a front view of the coupling structure 200 (the first member 10 and the second member 20 are viewed in cross section), and FIG. 11 is a plan view of the coupling structure 200 (the first member 10 is viewed in cross section).

In the coupling structure 200, the fixing means for fixing the first insertion portions 31 and the first member 10 by applying the external force to the first insertion portions 31 and the fixing means for fixing the second insertion portions 32 and the second member 20 by applying the external force to the second insertion portions 32 are different from those in the first embodiment. In the second embodiment, the fixing means has a configuration that is configured to increase the diameter of the dowel member 30 by the external force and fix the dowel member 30. The configuration will be described specifically below.

As shown in FIGS. 7 and 8, the dowel members 30 each has the first insertion portion 31 that is inserted into the first hole 12 of the first member 10 and the second insertion portion 32 that is inserted into the second hole 22 of the second member 20. In the second embodiment, unlike the first embodiment, the tapered portions are not formed on the outer circumferential surfaces of the first insertion portions 31 and the second insertion portions 32, and the outer diameter of the outer circumferential surfaces is substantially uniform. The outer diameter of the outer circumferential surfaces of the first insertion portions 31 and the second insertion portions 32 is slightly smaller than the inner diameter of the first holes 12 and the second holes 22. An outer circumference of the tip end of the first insertion portion 31 is formed to have a tapered shape in order to guide the insertion of the first insertion portion 31 into the first hole 12. An outer circumference of the tip end of the second insertion portion 32 is also formed to have a tapered shape.

Each of the dowel members 30 is a cylinder member with a C-shaped cross-section having a hollow portion 33 that penetrates through the dowel member 30 in the axial direction and an opening portion 34 that is formed from the outer circumferential surface to the hollow portion 33. The opening portion 34 is formed over the entirety in the axial direction of the dowel member 30.

As shown in FIGS. 8 and 9, the coupling structure 200 has, as the fixing means: a first radial hole 35 that is radially formed in the opening portion 34 of the first insertion portion 31; a second radial hole 36 that is radially formed in the opening portion 34 of the second insertion portion 32; a first insertion part 41 that is inserted into the first radial hole 35; a second insertion part 42 that is inserted into the second radial hole 36; a first bolt 43 serving as a first diameter increasing tool that increases the diameter of the first insertion portion 31 by press-fitting the first insertion part 41 into the first radial hole 35; and a second bolt 44 serving as a second diameter increasing tool that increases the diameter of the second insertion portion 32 by press-fitting the second insertion part 42 into the second radial hole 36. The dowel member 30, the first insertion part 41, and the second insertion part 42 are made of metal or resin.

The first radial hole 35 is formed from the outer circumferential surface of the first insertion portion 31 to the hollow portion 33 so as to overlap with a part of the opening portion 34. Specifically, the first radial hole 35 is formed of a pair of groove portions 35a and 35b that are respectively formed in mutually opposing end surfaces forming the opening portion 34. Similarly, the second radial hole 36 is formed from the outer circumferential surface of the second insertion portion 32 to the hollow portion 33 so as to overlap with a part of the opening portion 34. Specifically, the second radial hole 36 is formed of a pair of groove portions 36a and 36b that are respectively formed in the mutually opposing end surfaces forming the opening portion 34.

As shown in FIG. 11, the first radial hole 35 is formed to have a tapered shape in which a width in the circumferential direction is reduced from the outer circumferential surface of the first insertion portion 31 towards the hollow portion 33. In other words, the first radial hole 35 is formed to have the tapered shape in which the distance between bottom portions of the groove portions 35a and 35b is reduced towards the center of the dowel member 30. Similarly, the second radial hole 36 is also formed to have the tapered shape in which the distance between bottom portions of the groove portions 36a and 36b is reduced towards the center of the dowel member 30.

As shown in FIG. 8, the first insertion part 41 is formed to have a block shape having six outer surfaces, and the first insertion part 41 is inserted into the first radial hole 35 so as not to be rotatable. The first insertion part 41 is formed to have a tapered shape in which a distance between both side surfaces 41a and 41b is reduced towards the hollow portion 33. The central angle defined between both of the side surfaces 41a and 41b of the first insertion part 41 is larger than the central angle of the first radial hole 35 (the angle formed between bottom portions of the groove portions 35a and 35b). As the first insertion part 41 is inserted into the first radial hole 35 and moved forward, both of the side surfaces 41a and 41b respectively come into close contact with the bottom portions of the groove portions 35a and 35b of the first radial hole 35. Similarly, the second insertion part 42 is formed to have a block shape having six outer surfaces, and the second insertion part 42 is inserted into the second radial hole 36 so as not to be rotatable. The second insertion part 42 is formed to have a tapered shape in which a distance between both side surfaces 42a and 42b is reduced towards the hollow portion 33. The central angle defined between both of the side surfaces 42a and 42b of the second insertion part 42 is larger than the central angle of the second radial hole 36 (the angle formed between bottom portions of the groove portions 36a and 36b). As the second insertion part 42 is inserted into the second radial hole 36 and moved forward, both of the side surfaces 42a and 42b respectively come into close contact with the bottom portions of the groove portions 36a and 36b of the second radial hole 36.

An engaging hole 41c, with which the first bolt 43 is engaged, is formed in the first insertion part 41 so as to penetrate therethrough. An inner circumferential surface of the engaging hole 41c is formed with a female screw to which a male screw formed on an outer circumferential surface of the first bolt 43 is to be threaded. Similarly, an engaging hole 42c, with which the second bolt 44 is engaged, is formed in the second insertion part 42 so as to penetrate therethrough. An inner circumferential surface of the engaging hole 42c is formed with a female screw to which a male screw formed on an outer circumferential surface of the second bolt 44 is to be threaded.

The first insertion portion 31 of the dowel member 30 is formed with a hole 37 so as to be coaxial with the engaging hole 41c of the first insertion part 41 in a state in which the first insertion part 41 is inserted into the first radial hole 35. The hole 37 is radially formed so as to penetrate through the first insertion portion 31 from the outer circumferential surface of the first insertion portion 31 to the hollow portion 33. Similarly, the second insertion portion 32 of the dowel member 30 is formed with a hole 38 so as to be coaxial with the engaging hole 42c of the second insertion part 42 in a state in which the second insertion part 42 is inserted into the second radial hole 36 (see FIG. 7). The hole 38 is radially formed so as to penetrate through the second insertion portion 32 from the outer circumferential surface of the second insertion portion 32 to the hollow portion 33.

Holes 19 that respectively communicate with inner circumferential surfaces of the first holes 12 are formed in the first member 10 so as to extend perpendicularly to the first holes 12 into which the first insertion portions 31 of the dowel members 30 are inserted (see FIGS. 7 and 11). Similarly, holes 29 that respectively communicate with inner circumferential surfaces of the second holes 22 are formed in the second member 20 so as to extend perpendicularly to the second holes 22 into which the second insertion portions 32 of the dowel members 30 are inserted (see FIG. 7).

As shown in FIGS. 9 and 11, the first bolts 43 are each inserted into the hole 19 of the first member 10 and the hole 37 of the first insertion portion 31 and engaged with the engaging hole 41c of the first insertion part 41. Similarly, the second bolts 44 are each inserted into the hole 29 of the second member 20 and the hole 38 of the second insertion portion 32 and engaged with the engaging hole 42c of the second insertion part 42.

In the first member 10, accommodating holes 19a for respectively accommodating head portions 43a of the first bolts 43 are formed so as to be continuous with the holes 19. Similarly, in the second member 20, accommodating holes 29a for respectively accommodating head portions 44a of the second bolts 44 are formed so as to be continuous with the holes 29. Because the head portions 43a and 44a are respectively accommodated in the accommodating holes 19a and 29a and do not project out from the surfaces of the first member 10 and the second member 20, the first bolts 43 and the second bolts 44 do not interfere with other members.

Next, the coupling method of the first member 10 and the second member 20 with the coupling structure 200 will be described.

In a state in which the first insertion part 41 and the second insertion part 42 are respectively inserted into the first radial hole 35 and the second radial hole 36 of the dowel member 30, the first insertion portion 31 and the second insertion portion 32 of the dowel member 30 are respectively inserted into the first hole 12 of the first member 10 and the second hole 22 of the second member 20. In other words, the dowel member 30 is received across the first hole 12 of the first member 10 and the second hole 22 of the second member 20.

In this state, the first bolt 43 is inserted into the hole 19 of the first member 10 and the hole 37 of the first insertion portion 31 in a successive manner, and thereby, the first bolt 43 is screwed with the engaging hole 41c of the first insertion part 41. As the first bolt 43 is tightened, the head portion 43a of the first bolt 43 comes into contact with the bottom surface of the accommodating hole 19a of the first member 10. As the first bolt 43 is further tightened from this state, the first insertion part 41 is press-fitted to the inside of the first radial hole 35 by being moved forward in the first radial hole 35 and by causing both of the side surfaces 41a and 41b to come into close contact with the bottom portions of the groove portions 35a and 35b of the first radial hole 35 (the state shown in FIGS. 9 and 11). As the first insertion part 41 is press-fitted to the inside of the first radial hole 35, the first insertion portion 31 is deformed such that the opening width of the opening portion 34 is increased and the outer diameter of the first insertion portion 31 is increased. By doing so, the outer circumferential surface of the first insertion portion 31 comes into close contact with the inner circumferential surface of the first hole 12 of the first member 10, and the first insertion portion 31 and the first member 10 are fixed.

Similarly, the second bolt 44 is inserted into the hole 29 of the second member 20 and the hole 38 of the second insertion portion 32 in a successive manner, and thereby, the second bolt 44 is screwed with the engaging hole 42c of the second insertion part 42. As the second bolt 44 is tightened, the head portion 44a of the second bolt 44 comes into contact with the bottom surface of the accommodating hole 29a of the second member 20. As the second bolt 44 is further tightened from this state, the second insertion part 42 is press-fitted to the inside of the second radial hole 36 by being moved forward in the second radial hole 36 and by causing both of the side surfaces 42a and 42b to come into close contact with the bottom portions of the groove portions 36a and 36b of the second radial hole 36. As the second insertion part 42 is press-fitted to the inside of the second radial hole 36, the second insertion portion 32 is deformed such that the opening width of the opening portion 34 is increased and the outer diameter of the second insertion portion 32 is increased. By doing so, the outer circumferential surface of the second insertion portion 32 comes into close contact with the inner circumferential surface of the second hole 22 of the second member 20, and the second insertion portion 32 and the second member 20 are fixed. Note that, in FIG. 9, whereas the first insertion part 41 is shown to be at a state in which it is press-fitted to the inside of the first radial hole 35, the second insertion part 42 is shown to be at a state it is press-fitted to the inside of the second radial hole 36.

As described above, the first member 10 and the second member 20 are coupled by using the dowel member 30 (the state shown in FIG. 10).

In the coupling structure 200, by applying the external force to the first insertion portion 31 and the second insertion portion 32 of the dowel member 30 to increase the diameter, the first insertion portion 31 and the first member 10 are fixed, and at the same time, the second insertion portion 32 and the second member 20 are fixed, and thereby, the first member 10 and the second member 20 are coupled.

The coupling between the first member 10 and the second member 20 is released by releasing the engagement of the first bolt 43 with the first insertion part 41 and by releasing the engagement of the second bolt 44 with the second insertion part 42. As shown in FIG. 10, an annular groove 39 is formed between the first insertion portion 31 and the second insertion portion 32 in the outer circumferential surface of the dowel member 30 for partitioning both portions. The annular groove 39 faces the surfaces 11 and 21, which oppose to each other, of the first member 10 and the second member 20. By providing the annular groove 39, the deformation of the first insertion portion 31 caused by the first bolt 43 does not influence the second insertion portion 32, and in addition, the deformation of the second insertion portion 32 caused by the second bolt 44 does not influence the first insertion portion 31. In other words, because the annular groove 39 is present, mutual influence between the deformation of the first insertion portion 31 and the deformation of the second insertion portion 32 is prevented. Thus, it is possible to separate the first member 10 from the first insertion portion 31 only by releasing the engagement of the first bolt 43 with the first insertion part 41 (in a state in which the second bolt 44 remains engaged with the second insertion part 42).

In order to improve the closely-contacting force between the outer circumferential surface of the first insertion portion 31 and the inner circumferential surface of the first hole 12 of the first member 10, annular ribs may be formed on the outer circumferential surface of the first insertion portion 31.

According to the second embodiment described above, the following effects are obtained.

Because, with the coupling structure 200, the first member 10 and the second member 20 are coupled via the dowel member 30 by increasing the diameters of the first insertion portion 31 and the second insertion portion 32 of the dowel member 30 by applying the external force thereto, compared with a case in which two members are coupled by using bolts, etc., it is possible to couple the first member 10 and the second member 20 with ease.

In addition, because no projections, such as pins, etc., for coupling the first member 10 and the second member 20 are formed on the mutually opposing surfaces 11 and 21 of the first member 10 and the second member 20 in a state in which the first member 10 and the second member 20 are not coupled, an excellent handling property is achieved during transportation and assembly of the first member 10 and the second member 20.

The coupling structure 100 according to the first embodiment and the coupling structure 200 according to the second embodiment described above can be used, for example, for a module robot that is assembled by coupling a plurality of modules. Specifically, the coupling structure 100 and the coupling structure 200 can be used as coupling structures for coupling the modules together. In such a case, for example, the first member 10 and the second member 20 each serves as a case of the module. An example of the coupling of the modules will be described below.

The coupling of three modules 301 (301A, 301B, and 301C) configuring a module robot 300 will be described with reference to FIG. 12. Three modules 301A, 301B, and 301C are the identical modules. The phrase "the identical modules" means that the components configuring the modules are the same with each other, and that the shapes and dimensions of the components are the same with each other. In other words, the identical modules can also be referred to as identically-standardized items.

The module 301A has: a first link 302A; a second link 303A that is linked with the first link 302A so as to be freely movable in a relative manner; and a fluid pressure cylinder 304A that moves the first link 302A and the second link 303A in a relative manner. The first link 302A and the second link 303A are linked via a rotation shaft 305A so as to be freely rotatable from each other.

The fluid pressure cylinder 304A is extended/contracted by the working fluid supplied from a fluid pressure source. The extension/contraction of the fluid pressure cylinder 304A is controlled by a controller (not shown). A cylinder of the fluid pressure cylinder 304A is fixed to the first link 302A so as not be rotatable. In other words, the cylinder of the fluid pressure cylinder 304A forms a part of the first link 302A. A third link 306A is linked to a piston rod of the fluid pressure cylinder 304A and the second link 303A so as to be freely rotatable. Note that the third link 306A is not an essential configuration, and the piston rod of the fluid pressure cylinder 304A may be linked directly to the second link 303A so as to be freely rotatable.

The first link 302A and the second link 303A are formed with a plurality of holes 307A into which the dowel member 30 is inserted for coupling other module. The holes 307A each corresponds to the first hole 12 or the second hole 22. The plurality of holes 307A formed in the first link 302A are arranged at equal intervals from each other, the plurality of holes 307A formed in the second link 303A are arranged at equal intervals from each other, and it is preferable that the intervals of the plurality of holes 307A formed in the first link 302A be the same as the intervals of the plurality of holes 307A formed in the second link 303A. With such a configuration, it is possible to easily couple the modules 301 together via the dowel members 30. Note that the cylinder of the fluid pressure cylinder 304A may be configured so as to be exposed from the first link 302A, and the hole 307A may be formed in the surface of the cylinder of the fluid pressure cylinder 304A. In this case, the cylinder of the fluid pressure cylinder 304A corresponds to the first member 10 or the second member 20.

Because the configurations of the modules 301B and 301C are the same as the configuration of the module 301A, the description thereof is omitted. The components that are the same as those of the module 301A are assigned the reference numerals with "B" or "C" appended to the numerals that are the same as those assigned to the components of the module 301A.

Figure 12:
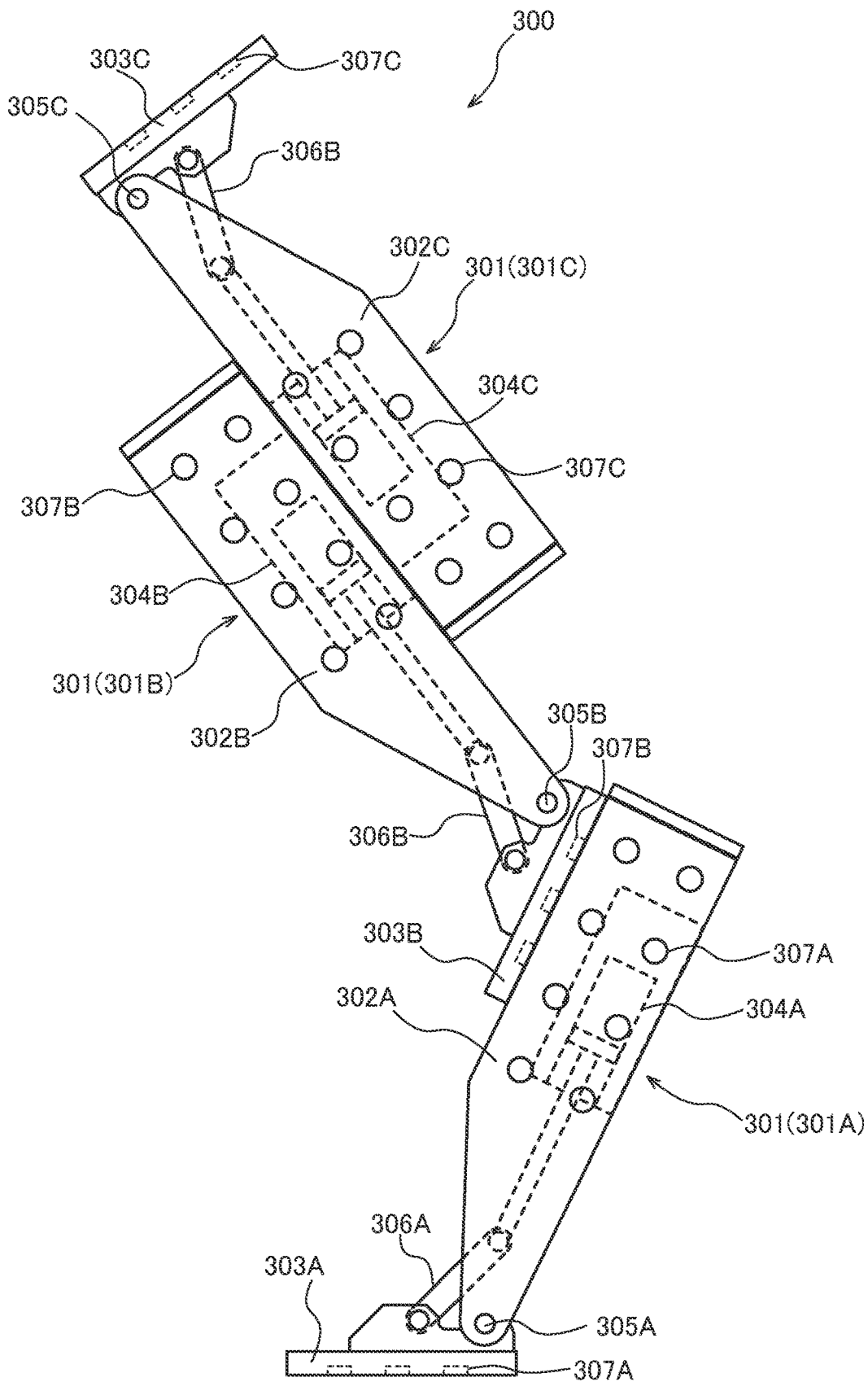
FIG. 12 is a side view of a module robot in which the coupling is achieved via the coupling structure according to the embodiment of the present invention.

FIG. 12 shows an example in which a leg portion robot is configured by coupling the modules 301A, 301B, and 301C so as to correspond to an ankle joint, a knee joint, and a hip joint, respectively. Specifically, the respective rotation shafts 305A, 305B, and 305C of the modules 301A, 301B, and 301C correspond to the ankle joint, the knee joint, and the hip joint. The second link 303A of the module 301A functions as a leg. In the module robot 300, each of the modules 301A, 301B, and 301C configures a single joint module, and the module robot 300 has three degrees of freedom as a whole.

In a case in which the module 301A is coupled to the module 301B by the coupling structure 100, 200, the first link 302A of the module 301A corresponds to the first member 10, and a second link 303B of the module 301B corresponds to the second member 20. The first link 302A of the module 301A and the second link 303B of the module 301B are coupled by using the dowel members 30.

In addition, in a case in which the module 301B is coupled to a module 301C by using the coupling structure 100, 200, a first link 302B of the module 301B corresponds to the first member 10, and a first link 302C of the module 301C corresponds to the second member 20. The first link 302B of the module 301B and the first link 302C of the module 301C are coupled by using the dowel members 30.

The module robot 300 is not limited to the leg portion robot shown in FIG. 12. For example, the module robot 300 may be made to have various applications and functions by fixing the second link 303A of the module 101A to the ground or a foundation and by attaching a bucket, a rod, or a hand to a second link 303C of the module 301C as an attachment. In addition, it is possible to configure a humanoid robot by further coupling the plurality of modules 301, in addition to the leg portion robot shown in FIG. 12. As described above, it is possible to easily configure various robots in accordance with the applications and the functions by only coupling the plurality of modules 301.

In the example shown in FIG. 12, a description has been given of the configuration in which the mutually identical modules 301 are coupled together. Instead of this configuration, the modules to be coupled may not be identical (may not be those having the same standard). For example, the modules having the first links with different shapes and/or dimensions from each other may be coupled with each other, or the modules having the fluid pressure cylinders with different stroke lengths from each other may be coupled with each other. In other words, the modules may be coupled freely in accordance with the desired motion of the module robot and/or the applications and functions of the module robot by preparing a plurality of modules with different standards. However, it is possible to manufacture the module robot with a lower cost by configuring the module robot by coupling the plurality of modules having the same standard.

As described above, by using the coupling structure 100 according to the first embodiment and the coupling structure 200 according to the second embodiment, the modules 301 can be coupled together with ease, and so, it is possible to reduce the time required to start the activation of the module robot 300. In addition, because the modules 301 are coupled together by using the dowel members 30, which are respectively inserted into the holes 307A, 307B, and 307C formed in the surfaces, there is no projection on the surfaces of the modules 301. Therefore, when the plurality of modules 301 are to be transported, the modules 301 can be transported by stacking them together, and so, the transportation is performed with a good efficiency.

The configurations, operations, and effects of the embodiments of the present invention will be collectively described below.

The coupling structure 100, 200 configured to couple the first member 10 and the second member 20 includes the dowel member 30 (the rod-shaped part) configured to be received across the first hole 12 formed in the first member 10 and the second hole 22 formed in the second member 20, wherein the dowel member 30 has: the first insertion portion 31 configured to be inserted into the first hole 12 of the first member 10; and the second insertion portion 32 configured to be inserted into the second hole 22 of the second member 20, and wherein the coupling structure 100, 200 is further provided with the fixing means, the fixing means being configured to fix the first insertion portion 31 and the first member 10 by applying the external force to the first insertion portion 31, and the fixing means being configured to fix the second insertion portion 32 and the second member 20 by applying the external force to the second insertion portion 32.

With this configuration, because the coupling structure 100, 200 is provided with the fixing means that fixes the first insertion portion 31 and the first member 10 by applying the external force to the first insertion portion 31 of the dowel member 30 and that fixes the second insertion portion 32 and the second member 20 by applying the external force to the second insertion portion 32 of the dowel member 30, it is possible to couple the first member 10 and the second member 20 via the dowel member 30 with ease. Thus, it is possible to couple the plurality of members with ease.

In addition, the fixing means has: the first clamp 13 provided in the first member 10, the first clamp 13 being configured to face the outer circumferential surface of the first insertion portion 31; the second clamp 23 provided in the second member 20, the second clamp 23 being configured to face the outer circumferential surface of the second insertion portion 32; the first piston 14 provided in the first member 10, the first piston 14 being configured to push the first clamp 13 against the outer circumferential surface of the first insertion portion 31 by receiving the fluid pressure; and the second piston 24 provided in the second member 20, the second piston 24 being configured to push the second clamp 23 against the outer circumferential surface of the second insertion portion 32 by receiving the fluid pressure.

With this configuration, because the first member 10 and the second member 20 are coupled via the dowel member 30 by applying the external force to the first insertion portion 31 and the second insertion portion 32 of the dowel member 30 by utilizing the fluid pressure, it is possible to couple the first member 10 and the second member 20 with ease.

In addition, the tapered portion 31a, 32a is formed on each of the outer circumferential surface of the first insertion portion 31 and the outer circumferential surface of the second insertion portion 32, the tapered portion 31a, 32a being formed so as to expand towards the end portion, the first clamp 13 is formed with the tapered portion 13a, the tapered portion 13a corresponding to the tapered portion 31a of the first insertion portion 31, and the second clamp 23 is formed with the tapered portion 23a, the tapered portion 23a corresponding to the tapered portion 32a of the second insertion portion 32.

With this configuration, even if the dimension is changed due to abrasion caused by the contact between the first insertion portion 31 and the first clamp 13 and abrasion caused by the contact between the second insertion portion 32 and the second clamp 23, because the contact surface between the first insertion portion 31 and the first clamp 13 and the contact surface between the second insertion portion 32 and the second clamp 23 have the tapered shape, the dimension change due to the abrasion can be absorbed, and so, it is possible to prevent the rattling of the first insertion portion 31 and the second insertion portion 32.

In addition, the dowel member 30 is a cylinder member with a C-shaped cross-section having: the hollow portion 33 penetrating through the dowel member 30 in the axial direction; and the opening portion 34 formed across the outer circumferential surface and the hollow portion 33. The fixing means has: the first radial hole 35 radially formed in the opening portion 34 of the first insertion portion 31; the second radial hole 36 radially formed in the opening portion 34 of the second insertion portion 32; the first insertion part 41 configured to be inserted into the first radial hole 35; the second insertion part 42 configured to be inserted into the second radial hole 36; the first diameter increasing tool configured to increase the diameter of the first insertion portion 31 by causing the first insertion part 41 to be press-fitted to the first radial hole 35; and the second diameter increasing tool configured to increase the diameter of the second insertion portion 32 by causing the second insertion part 42 to be press-fitted to the second radial hole 36.

With this configuration, by increasing the diameters by applying the external force to the first insertion portion 31 and the second insertion portion 32 of the dowel member 30, the first member 10 and the second member 20 are coupled via the dowel member 30, and therefore, it is possible to couple the first member 10 and the second member 20 with ease.

In addition, the first diameter increasing tool is the first bolt 43 configured to be engaged with the engaging hole 41c formed in the first insertion part 41, and the second diameter increasing tool is the second bolt 44 configured to be engaged with the engaging hole 42c formed in the second insertion part 42.

With this configuration, the external force for increasing the diameters of the first insertion portion 31 and the second insertion portion 32 is generated by tightening the first bolt 43 and the second bolt 44 to the first insertion part 41 and the second insertion part 42, respectively, and therefore, it is possible to couple the first member 10 and the second member 20 with ease.

In addition, the first radial hole 35 is formed to have a tapered shape, the tapered shape being configured such that the width in the circumferential direction is reduced from the outer circumferential surface of the first insertion portion 31 towards the hollow portion 33, the second radial hole 36 is formed to have a tapered shape, the tapered shape being configured such that the width in the circumferential direction is reduced from the outer circumferential surface of the second insertion portion 32 towards the hollow portion 33, the first insertion part 41 and the second insertion part 42 are each formed to have a tapered shape, the tapered shape being configured such that a distance between both side surfaces 41a and 41b, and 42a and 42b is reduced towards the hollow portion 33, and the central angles defined between the both side surfaces of the first insertion part and the second insertion part are respectively larger than the central angles of the first radial hole and the second radial hole.

With this configuration, because the first insertion part 31 and the second insertion part 32 can be caused to come into close contact with the first radial hole 35 and the second radial hole 36, respectively, it is possible to increase the diameters of the first insertion portion 31 and the second insertion portion 32 with ease.

In addition, the coupling structure 100, 200 is used to couple the plurality of modules 301 forming the module robot 300.

With this configuration, because the modules 301 can be coupled together with ease, it is possible to reduce the time required to start the activation of the module robot 300.

Embodiments of this invention were described above, but the above embodiments are merely examples of applications of this invention, and the technical scope of this invention is not limited to the specific constitutions of the above embodiments.

This application claims priority based on Japanese Patent Application No. 2020-167737 filed with the Japan Patent Office on Oct. 2, 2020, the entire contents of which are incorporated into this specification.

The invention claimed is:

1. A coupling structure for coupling a first member and a second member, the coupling structure comprising
a rod-shaped part configured to be received across a first hole formed in the first member and a second hole formed in the second member, wherein
the rod-shaped part has:
a first insertion portion configured to be inserted into the first hole of the first member; and
a second insertion portion configured to be inserted into the second hole of the second member, and wherein
the coupling structure further comprises a fixing configuration, the fixing configuration being configured to fix the first insertion portion and the first member by applying an external force to the first insertion portion, and the fixing configuration being configured to fix the second insertion portion and the second member by applying an external force to the second insertion portion, and
the fixing configuration is configured to tighten the rod-shaped part using fluid pressure.

2. The coupling structure according to claim 1, wherein the fixing configuration has:
a first clamp provided in the first member, the first clamp being configured to face an outer circumferential surface of the first insertion portion;
a second clamp provided in the second member, the second clamp being configured to face an outer circumferential surface of the second insertion portion;
a first piston provided in the first member, the first piston being configured to push the first clamp against the outer circumferential surface of the first insertion portion by receiving fluid pressure; and
a second piston provided in the second member, the second piston being configured to push the second clamp against the outer circumferential surface of the second insertion portion by receiving fluid pressure.

3. The coupling structure according to claim 2, wherein a tapered portion is formed on each of the outer circumferential surface of the first insertion portion and the outer circumferential surface of the second insertion portion, the tapered portion being formed so as to expand towards an end portion,
the first clamp is formed with a tapered portion, the tapered portion corresponding to the tapered portion of the first insertion portion, and
the second clamp is formed with a tapered portion, the tapered portion corresponding to the tapered portion of the second insertion portion.

4. The coupling structure according to claim 1, wherein the coupling structure is used to couple a plurality of modules forming a module robot.

5. A coupling structure, for coupling a first member and a second member, the coupling structure comprising:
a rod-shaped part configured to be received across a first hole formed in the first member and a second hole formed in the second member, wherein
the rod-shaped part has:
a first insertion portion configured to be inserted into the first hole of the first member; and
a second insertion portion configured to be inserted into the second hole of the second member, and wherein
the coupling structure further comprises a fixing configuration, the fixing configuration being configured to fix the first insertion portion and the first member by applying an external force to the first insertion portion, and the fixing configuration being configured to fix the second insertion portion and the second member by applying an external force to the second insertion portion, and
the fixing configuration is configured to increase a diameter of the rod-shaped part by the external force.

6. The coupling structure according to claim 5, wherein the rod-shaped part is a cylinder member with a C-shaped cross-section having: a hollow portion penetrating through the rod-shaped part in an axial direction; and an opening portion formed across an outer circumferential surface and the hollow portion, and wherein
the fixing configuration has:
a first radial hole radially formed in the opening portion of the first insertion portion;
a second radial hole radially formed in the opening portion of the second insertion portion;
a first insertion part configured to be inserted into the first radial hole;
a second insertion part configured to be inserted into the second radial hole;
a first diameter increasing tool configured to increase a diameter of the first insertion portion by causing the first insertion part to be press-fitted to the first radial hole; and
a second diameter increasing tool configured to increase a diameter of the second insertion portion by causing the second insertion part to be press-fitted to the second radial hole.

7. The coupling structure according to claim 6, wherein
the first diameter increasing tool is a first bolt configured
to be engaged with an engaging hole formed in the first
insertion part, and the second diameter increasing tool is a second bolt configured to be engaged with an engaging hole formed in the second insertion part.

8. The coupling structure according to claim 6, wherein
the first radial hole is formed to have a tapered shape, the tapered shape being configured such that a width in a circumferential direction is reduced from the outer circumferential surface of the first insertion portion towards the hollow portion, the second radial hole is formed to have a tapered shape, the tapered shape being configured such that a width in a circumferential direction is reduced from the outer circumferential surface of the second insertion portion towards the hollow portion, the first insertion part and the second insertion part are each formed to have a tapered shape, the tapered shape being configured such that a distance between both side surfaces is reduced towards the hollow portion, and central angles defined between the both side surfaces of the first insertion part and the second insertion part are respectively larger than central angles of the first radial hole and the second radial hole.

9. The coupling structure according to claim 5, wherein
the coupling structure is used to couple a plurality of modules forming a module robot.

* * * * *